UNITED STATES PATENT OFFICE.

OSCAR DRESSEL, OF ELBERFELD, AND RICHARD KOTHE AND HEINRICH HOERLEIN, OF VOHWINKEL, GERMANY, ASSIGNORS TO FARBENFABRIKEN VORM. FRIEDR. BAYER & CO., OF ELBERFELD, GERMANY, A CORPORATION OF GERMANY.

AZO DYE.

965,882.  Specification of Letters Patent.  Patented Aug. 2, 1910.

No Drawing.  Application filed April 1, 1910.  Serial No. 553,919.

*To all whom it may concern:*

Be it known that we, OSCAR DRESSEL, residing at Elberfeld, and RICHARD KOTHE and HEINRICH HOERLEIN, residing at Vohwinkel, near Elberfeld, Germany, doctors of philosophy, chemists, citizens of the German Empire, have invented new and useful Improvements in Azo Dyes, of which the following is a specification.

This invention relates to the manufacture and production of new azo dyestuffs for wool which are obtained by combining the diazo compounds of aminoarylsulfonamids having the following general formula:

(R meaning phenyl and naphthyl and derivatives thereof, $R_1$ and $R_2$ meaning hydrogen, alkyl, phenyl and naphthyl and derivatives thereof) with pyrazolons. The new dyestuffs are after being dried and pulverized from yellow to brown powders soluble in water with a yellow color. They dye wool yellow shades which are remarkable for their excellent fastness to fulling and to washing. Upon treatment with $SnCl_2$ and hydrochloric acid they are split up, aminoarylsulfonamids and 4-aminopyrazolons being obtained.

In order to illustrate the new process more fully the following example is given, the parts being by weight:—26.2 parts of 4-toluidin-2-sulfonanilid

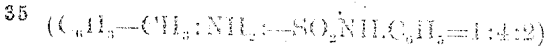

are diazotized with 7 parts of sodium nitrite and hydrochloric acid. The diazo compound is then added to an aqueous solution containing an excess of sodium carbonate of 25.5 parts of 1-para-sulfophenyl-3-methyl-5-pyrazolon. After the combination is finished common salt is added and the mixture is heated to about 60° C. The dye is then filtered off and dried. It is a yellow powder soluble in water and in concentrated sulfuric acid with a yellow color. It yields upon reduction with stannous chlorid and hydrochloric acid 4-toluidin-2-sulfonanilid and 1-sulfophenyl-3-methyl-4-amino-5-pyrazolon. It dyes wool from acid baths yellow shades.

The process is carried out in an analogous manner on starting from other sulfonamids e. g. meta-aminobenzenesulfonanilid, ortho-anisidin-para-sulfonanilid, ortho-anisidin-para-sulfonamid, ortho-toluidin-para-sulfontoluidid:

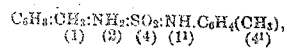

ortho-chloroanilin-para-sulfonxylidid:

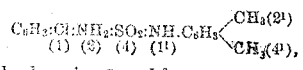

1-naphthylamin-6-sulfonamid, para-toluidin-ortho-sulfo-1-naphthylamin-5-sulfonic acid; the pyrazolon can be replaced by other pyrazolon derivatives e. g. 1-phenyl-3-methyl-5-pyrazolon, 1-naphthyl-3-methyl-5-pyrazolon, 1-naphthyl-5-pyrazolon sulfonic acids, 3-methyl-5-pyrazolon, 5-pyrazolon carboxylic acids, sulfoarylpyrazolon carboxylic acids etc.

The sulfonic acids of the new dyes can also be obtained by first combining the above mentioned diazo compounds with pyrazolons containing no sulfonic groups and then sulfonating the dyes.

We claim:—

1. The herein described new dyestuffs obtainable from the herein-specified diazotized aminoarylsulfonamids and pyrazolons, which dyes are after being dried and pulverized from yellow to brown powders soluble in water with a yellow color which dye wool from acid baths yellow shades and yield upon treatment with stannous chlorid and hydrochloric acid the herein-specified aminoarylsulfonamids and 4-aminopyrazolons, substantially as described.

2. The herein described new dyestuff obtainable from diazotized 4-toluidin-2-sulfonanilid and 1-sulfophenyl-3-methyl-5-pyrazolon, which is after being dried and pulverized in the shape of its sodium salt a yellow powder soluble in water and in concentrated sulfuric acid with a yellow color; dyeing wool yellow shades; and yielding upon reduction with stannous chlorid and hydrochloric acid 4-toluidin-2-sulfonanilid and 1-sulfophenyl-3-methyl-4-amino-5-pyrazolon, substantially as described.

In testimony whereof we have hereunto set our hands in the presence of two subscribing witnesses.

OSCAR DRESSEL. [L. S.]
RICHARD KOTHE. [L. S.]
HEINRICH HOERLEIN. [L. S.]

Witnesses:
 OTTO KÖNIG,
 CHAS. J. WRIGHT.